(12) United States Patent
Kobayashi et al.

(10) Patent No.: US 10,981,534 B2
(45) Date of Patent: Apr. 20, 2021

(54) GAS GENERATOR

(71) Applicant: DAICEL CORPORATION, Osaka (JP)

(72) Inventors: Tomoharu Kobayashi, Tatsuno (JP); Mikio Yabuta, Tatsuno (TW); Yuki Fukui, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 186 days.

(21) Appl. No.: 16/343,507

(22) PCT Filed: Oct. 16, 2017

(86) PCT No.: PCT/JP2017/037319
§ 371 (c)(1),
(2) Date: Apr. 19, 2019

(87) PCT Pub. No.: WO2018/088134
PCT Pub. Date: May 17, 2018

(65) Prior Publication Data
US 2019/0241149 A1    Aug. 8, 2019

(30) Foreign Application Priority Data
Nov. 10, 2016   (JP) .............................. JP2016-219327

(51) Int. Cl.
*B60R 21/263*   (2011.01)
*B60R 21/268*   (2011.01)
(Continued)

(52) U.S. Cl.
CPC .......... *B60R 21/263* (2013.01); *B60R 21/264* (2013.01); *B60R 21/268* (2013.01); *B60R 21/261* (2013.01); *B60R 2021/2642* (2013.01)

(58) Field of Classification Search
CPC ... B60R 21/263; B60R 21/264; B60R 21/268; B60R 2021/2642
See application file for complete search history.

(56) References Cited

U.S. PATENT DOCUMENTS 7,950,693 B2    5/2011  Jackson et al.
2005/0225064 A1*  10/2005 Suehiro ............... B60R 21/2644
                                                              280/741
(Continued)

FOREIGN PATENT DOCUMENTS

JP    4970671 B2 *  7/2012

OTHER PUBLICATIONS

English translation of the Written Opinion of the International Searching Authority for International Application No. PCT/JP2017/037319, dated May 14, 2019.

*Primary Examiner* — James A English
(74) *Attorney, Agent, or Firm* — Birch, Stewart, Kolasch & Birch, LLP

(57) ABSTRACT

The present invention provides a gas generator including:
a housing having a top plate, a bottom plate located axially opposite to the top plate, and a circumferential wall located between the top plate and the bottom plate and provided with a gas discharge port;
a partition wall provided with a single first communication hole, the partition wall being radially disposed in the housing to partition an interior of the housing into a first combustion chamber on the side of the top plate, which accommodates a first gas generating agent, and a second combustion chamber on the side of the bottom plate, which accommodates a second gas generating agent;
a cylindrical guide member disposed between the first igniter attached to the bottom surface and the first communication hole, and provided with a second communication hole in a cylindrical wall thereof,
the cylindrical guide member being disposed so as to enclose the first igniter, such that a second end opening thereof is connected to the first communication hole of the partition wall,
the second end opening or the first communication hole being closed by a first closing member in a state where the second end opening or the first communication hole faces the first combustion chamber, the second communication hole closed by a second closing member in a state where the second communication hole faces the second combustion chamber, and a rupturing pressure (Continued)

of the first closing member being set lower than a rupturing pressure of the second closing member.

10 Claims, 3 Drawing Sheets

(51) Int. Cl.
*B60R 21/264* (2006.01)
*B60R 21/261* (2011.01)

(56) References Cited

U.S. PATENT DOCUMENTS

| | | | |
|---|---|---|---|
| 2006/0131853 A1* | 6/2006 | Iwai | B60R 21/2644 |
| | | | 280/736 |
| 2014/0054881 A1* | 2/2014 | Fukawatase | B60R 21/26 |
| | | | 280/741 |
| 2019/0176745 A1* | 6/2019 | Fukui | B01J 7/00 |
| 2020/0039463 A1* | 2/2020 | Fukui | F42B 3/12 |

* cited by examiner

[Fig. 1]
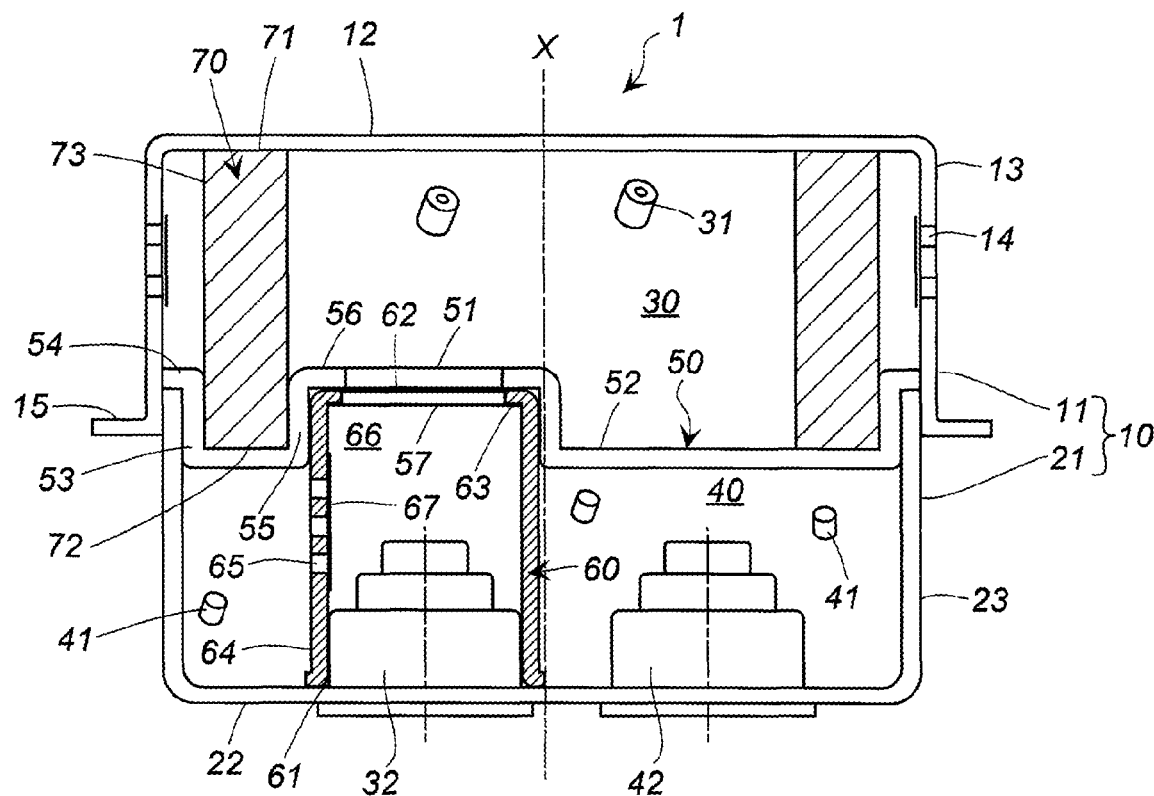
[Fig. 2]
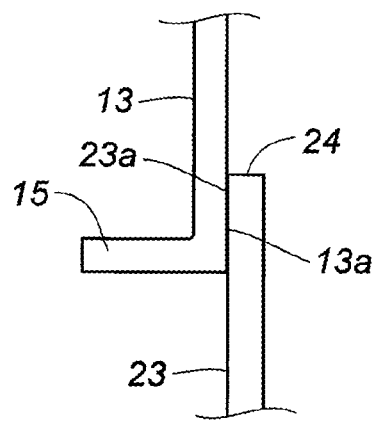

[Fig. 3]
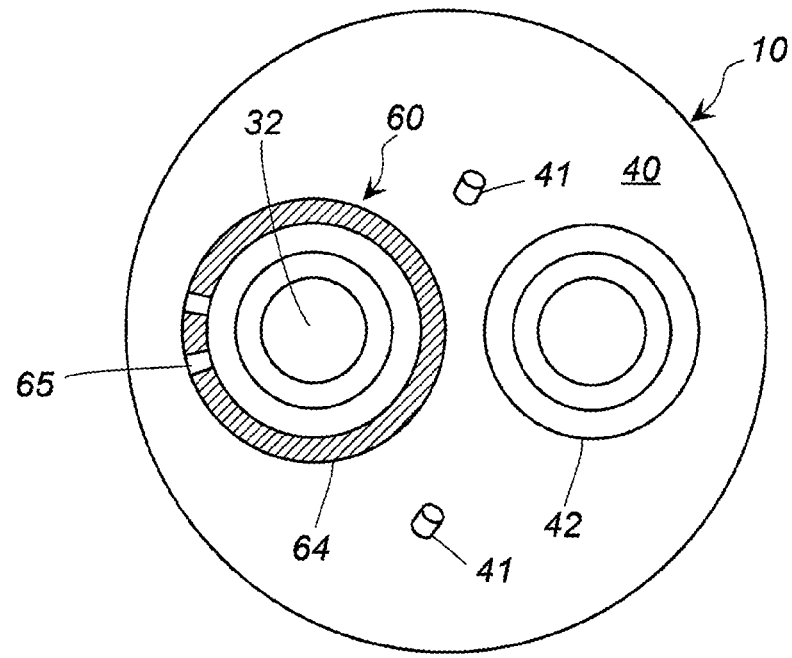
[Fig. 4]
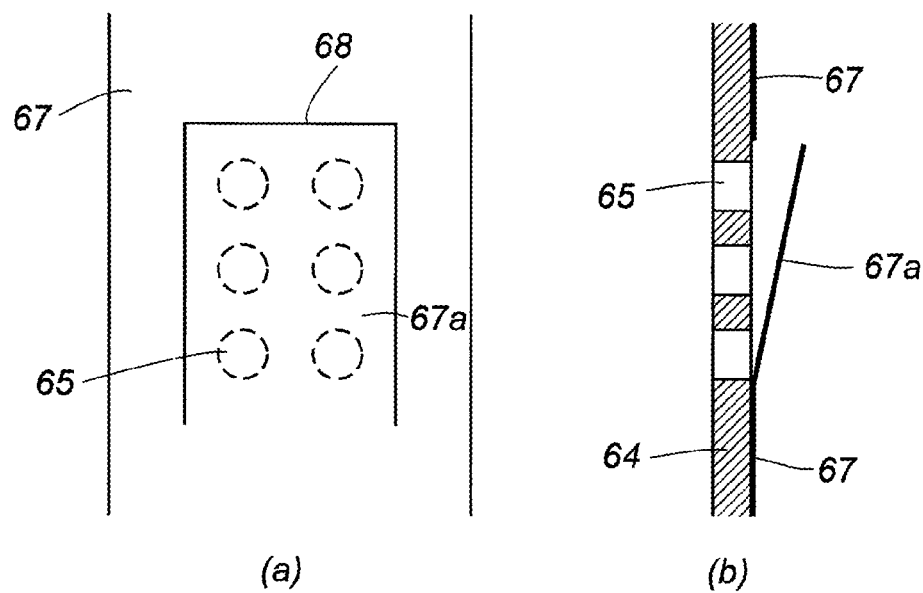
(a)　　　　　(b)

[Fig. 5]
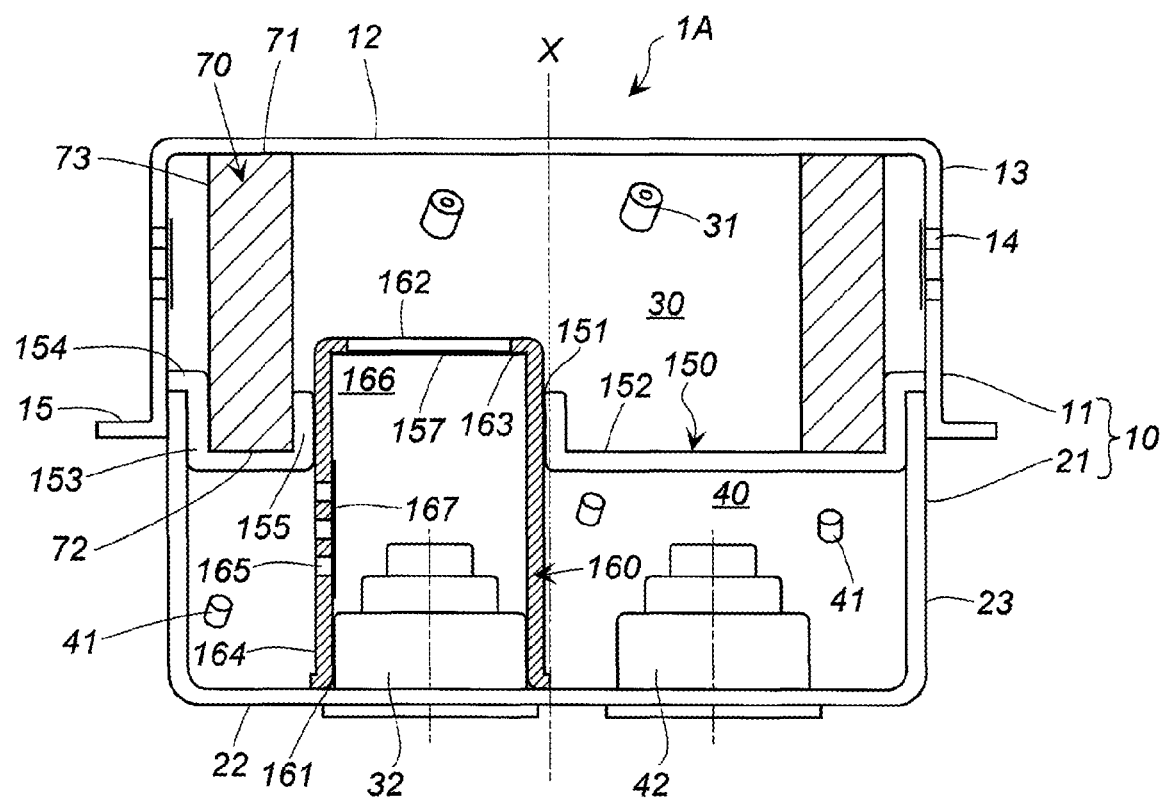

GAS GENERATOR

TECHNICAL FIELD

The present invention relates to a gas generator usable in an airbag apparatus mounted to an automobile.

DESCRIPTION OF RELATED ART

A gas generator in which an interior of a housing is vertically separated by a partition wall is known.

FIGS. 1 to 3 in U.S. Pat. No. 7,950,693B disclose a gas generator in which a divider plate 36 is disposed inside a housing 12 to form a first chamber 40 on the upper side of the housing 12 and a second chamber 42 on the lower side. Squibs 74 and 94 are disposed in order to burn a gas generating agent in the respective chambers. A hole 46 in which a cup 82 passes through, and an opening 44 into which a plug element 50 is fitted are formed in the divider plate 36. When the squib 74 actuates, the cup 82 is ruptured and causes the gas generating agent in the first chamber 40 to be ignited and burned. When the squib 94 actuates, since the plug element 50 blocking the opening 44 of the separating wall 36 is unplugged, gas generated in the second chamber 42 directly flows into the first chamber 40 through the opened opening 44.

SUMMARY OF INVENTION

A first aspect of the present invention (hereinafter, referred to as "the first aspect") provides a gas generator, including: a housing having a top plate, a bottom plate located axially opposite to the top plate, and a circumferential wall located between the top plate and the bottom plate and provided with a gas discharge port;

a partition wall provided with a first communication hole including a single through hole, the partition wall being radially disposed in the housing to partition an interior of the housing into a first combustion chamber on the side of the top plate, which accommodates a first gas generating agent, and a second combustion chamber on the side of the bottom plate, which accommodates a second gas generating agent;

a first igniter for burning the first gas generating agent and a second igniter for burning the second gas generating agent, the first and second igniters being attached to the bottom plate;

a cylindrical guide member being disposed between the first igniter and the first communication hole of the partition wall and provided with a second communication hole in a cylindrical wall thereof, the cylindrical guide member being disposed so as to enclose the first igniter, such that a first end opening thereof is located on the side of the bottom plate and a second end opening thereof is connected to the first communication hole of the partition wall, the second end opening or the first communication hole being closed by a first closing member in a state where the second end opening or the first communication hole faces the first combustion chamber, the second communication hole being closed by a second closing member in a state where the second communication hole faces the second combustion chamber, and a rupturing pressure of the first closing member being set lower than a rupturing pressure of the second closing member.

A second aspect of the present invention (hereinafter, referred to as "the second aspect") provides a gas generator, including: a housing having a top plate, a bottom plate located axially opposite to the top plate, and a circumferential wall located between the top plate and the bottom plate and provided with a gas discharge port;

a partition wall provided with a first communication hole including a single through hole, the partition wall being radially disposed in the housing to partition an interior of the housing into a first combustion chamber on the side of the top plate, which accommodates a first gas generating agent, and a second combustion chamber on the side of the bottom plate, which accommodates a second gas generating agent;

a first igniter for burning the first gas generating agent and a second igniter for burning the second gas generating agent, the first and second igniters being attached to the bottom plate;

a cylindrical guide member being disposed between the first igniter and the first communication hole of the partition wall and provided with a second communication hole in a cylindrical wall thereof, the cylindrical guide member being disposed so as to enclose the first igniter, such that a first end opening thereof is located on the side of the bottom plate and a second end opening side thereof enters into the first communication hole and faces an interior of the first combustion chamber, and the second end opening being closed by a first closing member in a state where the second end opening faces the first combustion chamber, the second communication hole being closed by a second closing member in a state where the second communication hole faces the second combustion chamber, and a rupturing pressure of the first closing member being set lower than a rupturing pressure of the second closing member.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows an axial cross-sectional view of a gas generator of the present invention;

FIG. 2 shows a partial cross-sectional view of a housing of the gas generator shown in FIG. 1;

FIG. 3 shows a schematic plane view including a partial cross-sectional view for illustrating a positional relation between a second communication hole and a second igniter (portions not required for illustrating the positional relation are omitted);

FIG. 4 shows, in (a), a front view depicting an embodiment of a second closing member of a gas generator and, in (b), an explanatory diagram of an operation when the second closing member shown in (a) is used; and FIG. 5 shows an axial cross-sectional view of a gas generator which is a different embodiment from the gas generator shown in FIG. 1.

DETAILED DESCRIPTION OF INVENTION

The present invention provides a gas generator which is capable of actuating a first igniter and a second igniter with a time difference and separately igniting and burning a first gas generating agent and a second gas generating agent, and in which the second gas generating agent is prevented from being ignited and burned by the first igniter actuated first.

When a bottom plate of a housing is located on the lower side and a top plate thereof is located on the upper side in the gas generator of the present invention, an interior of the housing is vertically partitioned into two combustion chambers by a partition wall, i.e. a first combustion chamber on the upper side and a second combustion chamber on the lower side. The first igniter and the second igniter are attached to holes formed in the bottom plate respectively.

The first igniter and the first combustion chamber (the first gas generating agent) are connected to each other via a cylindrical guide member, and the first igniter and the first gas generating agent are not in contact with each other. A disposition state of the cylindrical guide member is not limited as long as a first end opening is located on the side of the bottom plate and a second end opening or a first communication hole faces the first combustion chamber. For example, the second end opening and the first communication hole may abut against each other to form a single hole. In this case, by closing the second end opening or the first communication hole with a first closing member, a path extending from an interior of the cylindrical guide member to the first combustion chamber is closed. A known transfer charge or a gas generating agent that functions as a known transfer charge can be accommodated inside the cylindrical guide member if necessary.

The housing, the partition wall and the cylindrical guide member are all made of a metal such as iron or stainless steel.

Since the second igniter is disposed inside the second combustion chamber, the second igniter and the second gas generating agent are in contact with each other.

As the first closing member closing the second end opening of the cylindrical guide member and the second closing member closing a second communication hole formed in a cylindrical wall of the cylindrical guide member, a metallic adhesive tape, in which an adhesive layer is formed on a metallic tape made of a stainless steel, aluminum or the like, is applied to close the second end opening and the communication hole respectively. Instead of closing the second end opening of the cylindrical guide member with the first closing member, the first communication hole of the partition wall may be closed with the first closing member. Further, with respect to the second end opening and the second communication hole, a bag container or a cup container made of aluminum (a bag container or a cup container filled with a transfer charge therein) can be disposed inside the cylindrical guide member, and portions of the bag container facing the second end opening and the second communication hole can be used as the first closing member and the second closing member respectively. In this case, the first closing member and the second closing member are integrally formed.

When the first igniter actuates and combustion products such as flames (when the transfer charge is used, combustion products such as flames generated by combustion of the transfer charge) are generated, a rise in pressure inside the cylindrical guide member causes the first closing member closing the second end opening to be ruptured and the combustion products enter the first combustion chamber and ignite and burn the first gas generating agent. Combustion gas generated by the combustion of the first gas generating agent is discharged from a gas discharge port formed in a circumferential wall of the housing. The pressure generated inside the cylindrical guide member is higher than a rupturing pressure of the first closing member but lower than a rupturing pressure of the second closing member.

When the second igniter actuates and combustion products are generated, the second gas generating agent is immediately ignited and burned and generates combustion gas. The generated combustion gas first ruptures the second closing member of the second communication hole formed in the cylindrical wall of the cylindrical guide member and enters the cylindrical guide member, enters the first combustion chamber from the opened first communication hole, and is then discharged from the gas discharge port formed in the circumferential wall of the housing. In the second combustion chamber, since the second closing member corresponds to a fragile portion and the partition wall has no means for allowing direct communication between the first combustion chamber and the second combustion chamber, the second closing member is always ruptured when the pressure inside the second combustion chamber rises.

As described above, with the gas generator in accordance with the present invention, the second closing member is ruptured with good reproducibility when the gas generating agent in the second combustion chamber burns. Therefore, unlike the invention disclosed in U.S. Pat. No. 7,950,693 B, it is unnecessary to adjust with high working accuracy dimensions and shapes of a plug and a through hole for communicating the first combustion chamber and the second combustion chamber.

Further, in the gas generator in accordance with the present invention, a relation represented as "rupturing pressure of first closing member <rupturing pressure of second closing member" is satisfied, the first closing member is ruptured first at the time of actuation, pressure drops after the first closing member is ruptured first, and thereby, the second closing member is never ruptured when the first igniter actuates. Accordingly, inflow of the combustion gas from the first combustion chamber to the second combustion chamber is prevented by utilizing a difference in rupturing pressure between the closing members. As a result, it is possible to achieve prevention of a malfunction such that the second gas generating agent inside the second combustion chamber is ignited and burned by actuation of the first igniter, with an uncomplicated and simple structure. The rupturing pressures can be adjusted by differentiating specifications (a material, a thickness, and the like) of the respective closing members or by differentiating diameters of the respective holes to be covered by the closing members. Alternatively, both the specifications of the closing members and the diameters of the holes can be differentiated.

A gas generator of the second aspect is the same as the gas generator of the first aspect except that a positional relation between a first communication hole and the second end opening side of a cylindrical guide member is different. The second end opening side of a cylindrical guide member includes an aspect in which the second end opening side of the cylindrical guide member enters into the first communication hole and faces an interior of the first combustion chamber, and also an aspect in which the second end opening side enters into the first communication hole, goes beyond the first communication hole and is located inside the first combustion chamber. Thereby, the second end opening of the cylindrical guide member is beyond the partition wall and located inside the first combustion chamber, and faces the top plate. The gas generator of the second aspect operates in a similar manner to the gas generator of the first aspect.

In a preferable aspect of the gas generator in accordance with the present invention (the first aspect and the second aspect), the second communication hole of the cylindrical guide member is formed only on a surface of the cylindrical wall, opposite to a surface facing the second igniter.

When the second igniter actuates, the second gas generating agent inside the second combustion chamber is ignited and burned successively from the proximity to the second igniter. At this point, if the second communication hole formed in the cylindrical wall of the cylindrical guide member faces the second igniter, such a situation occurs that, at a point when part of the second gas generating agent is burned in the second combustion chamber, only the second gas generating agent present between the second igniter and the second communication hole preferentially is burned and the second gas generating agent present at other locations is less readily burn. Further, conceivably, the second closing member can be directly subjected to ignition energy (high-temperature gas, flames, pressure, and the like) generated at the time of actuation of the second igniter and can be ruptured before pressure inside the second combustion chamber rises to a prescribed pressure. In this case, combustion performance of the entire second gas generating agent is impaired. When the second communication hole is opened and an outflow of combustion gas occurs with part of the second gas generating agent left unburned as described above, it is conceivable that a problem of delayed combustion of the unburned second gas generating agent occurs. In consideration thereof, by forming the second communication hole of the cylindrical guide member only on a surface opposite (a radially opposite surface) to a surface facing the second igniter of the cylindrical wall as in the present aspect, the combustion gas generated in the second combustion chamber comes into contact with substantially all of the second gas generating agent in the second combustion chamber until the combustion gas reaches the second communication hole, and thereby, combustion of the entire second gas generating agent is promoted. An excessively short distance between the second communication hole and the circumferential wall of the housing results in a reduced amount or an absence of the second gas generating agent between the second communication hole and the circumferential wall, which undesirably causes the second closing member to take a longer time to rupture.

In a further preferable aspect of the gas generator in accordance with the present invention (the first aspect and the second aspect), the first closing member and the second closing member are made of a same material and have a same thickness, and the second communication hole is formed in plurality and a hole diameter of each one of the second communication holes is smaller than a hole diameter of the second end opening.

The present aspect is one of the simplest means to satisfy the relation represented as "rupturing pressure of first closing member <rupturing pressure of second closing member". Since the present aspect only involves adjusting sizes of the second end opening and the hole diameters of the second communication holes, the present aspect is more easily realized than adjusting sizes and shapes of the hole 44 and the plug 50 in U.S. Pat. No. 7,950,693B.

As other means, the followings can be listed:

a method of setting the hole diameter of the first communication hole and the hole diameter of each one of the second communication holes to a same hole diameter and adjusting a magnitude relationship between strengths (tensile strengths) of the first closing member and the second closing member;

a method of adjusting a magnitude relationship between the hole diameter of the first communication hole and the hole diameter of each one of the second communication holes and further adjusting a magnitude relationship between strengths (tensile strengths) of the first closing member and the second closing member; and a method of applying a scratch to the first closing member to make the first closing member more rupturable.

In a further preferable aspect of the gas generator in accordance with the present invention (the first aspect and the second aspect), when the rupturing pressure of the second closing member is 1, the rupturing pressure of the first closing member is not more than 0.90.

When satisfying the relation represented as "rupturing pressure (p1) of first closing member <rupturing pressure (p2) of second closing member", p1/p2≤0.90 enhances reliability and is therefore preferable. With respect to p1/p2, for example, when the first closing member and the second closing member are the same and an area of the second end opening is twice an area of each one of the second communication holes, since the first closing member is subjected to twice the pressure applied to the second closing member, p1/p2=0.5.

In a further preferable aspect of the gas generator in accordance with the present invention (the first aspect and the second aspect), the second end opening of the cylindrical guide member has an annular surface protruding inward, the first closing member is disposed from inside onto the annular surface and closes the second end opening, and the second closing member is disposed from inside onto the cylindrical wall of the cylindrical guide member and closes the second communication hole.

The first closing member is located to face an ignition portion (a portion where an ignition charge is accommodated) of the first igniter, and when the first closing member is disposed on an inner side of the annular surface, the first closing member is less likely to be ruptured even when being subjected to ignition energy (high-temperature gas, flames, pressure, and the like) generated at the time of actuation of the igniter. Further, comparing a case where the second closing member is applied from the outside of the cylindrical guide member and a case where the second closing member is applied from the inside of the cylindrical guide member, when the first igniter actuates in the same manner and the second closing member is subjected to pressure from the inside, the case where the second closing member is applied from the inside is preferable since the second closing member is less likely to be ruptured and combustion performance of the transfer charge inside the cylindrical guide member is maintained.

Alternatively, as long as the rupturing pressure of the second closing member is kept higher than the rupturing pressure of the first closing member, the first closing member may be disposed on the outer side of the cylindrical guide member. In this case, the first closing member may close either the inner side or the outer side of the first communication hole.

With the gas generator in accordance with the present invention, since the magnitude relationship between the rupturing pressure of the first closing member closing the second end opening and the rupturing pressure of the second closing member closing the second communication hole is defined, when the first igniter actuates first, only the first closing member is ruptured, the second closing member is not ruptured and the second gas generating agent inside the second combustion chamber is not ignited and burned.

The gas generator in accordance with the present invention is usable as a gas generator for an airbag apparatus mounted to an automobile.

Embodiments of the Present Invention

An embodiment of a gas generator in accordance with the present invention will be described with reference to FIG. 1.

A gas generator 1 has a housing 10 including a diffuser shell 11 and a closure shell 21. The diffuser shell 11 and the closure shell 21 are both made of a metal such as iron or stainless steel. The diffuser shell 11 includes a top plate 12 and an upper circumferential wall 13, and a plurality of gas discharge ports 14 are formed at regular intervals in a circumferential direction in the upper circumferential wall 13. The upper circumferential wall 13 has a flange 15 at an opening thereof. The plurality of gas discharge ports 14 are closed from inside by a metallic seal tape.

The closure shell 21 includes a bottom plate 22 and a lower circumferential wall 23. Two holes spaced apart from each other are formed in the bottom plate 22, and a first igniter 32 and a second igniter 42 are mounted to the two holes respectively. The first igniter 32 is disposed at a position closer to the central axis X of the housing 10, and the second igniter 42 is disposed at a position further from the central axis X of the housing 10 as compared to the first igniter 32. In the embodiment shown in FIG. 1, the first igniter 32 is disposed such that a central axis of the first igniter 32 is located within a range of 20% to 30% of a distance from the central axis X to the lower circumferential wall 23. Further, in the embodiment shown in FIG. 1, the second igniter 42 is disposed such that a central axis of the second igniter 42 is located within a range of 40% to 60% of the distance from the central axis X to the lower circumferential wall 23.

In the housing 10, an inner surface 13a in a vicinity of the opening of the upper circumferential wall 13 of the diffuser shell 11 and an outer surface 23a in a vicinity of an opening of the lower circumferential wall 23 of the closure shell 21 are in contact with each other, and the contact portion is welded and fixed in this state. As shown in FIG. 2, in the housing 10, the closure shell 21 is fitted into the diffuser shell 11, so that an annular stepped surface 24 is formed between the upper circumferential wall 13 and an annular end surface of the lower circumferential wall 23.

An interior of the housing 10 is partitioned by a radially disposed partition wall 50 into a first combustion chamber 30 on the top plate 12 side and a second combustion chamber 40 on the bottom plate 22 side. A first gas generating agent 31 is accommodated in the first combustion chamber 30 and a second gas generating agent 41 is accommodated in the second combustion chamber 40.

The partition wall 50 has a first communication hole 51 located eccentrically to the central axis X of the housing 10 toward the circumferential wall (the upper circumferential wall 13 and the lower circumferential wall 23), and the first communication hole is a single through hole. The partition wall 50 has a flat surface 52, an outer annular wall 53 extending toward the top plate 12 from an outer circumferential edge of the flat surface 52, and an outer annular surface 54 protruding radially outward from the outer annular wall 53. Furthermore, the partition wall 50 has an inner annular wall 55 extending toward the top plate 12 from the flat surface 52 along a cylindrical guide member 60 disposed in the second combustion chamber 40, and an inner annular surface 56 protruding radially inward from the inner annular wall 55. In the partition wall 50, the outer annular surface 54 abuts against the annular stepped surface 24, and the inner annular surface 56 abuts against an annular surface 63 of the cylindrical guide member 60.

In the embodiment shown in FIG. 1, a cylindrical filter 70 is disposed. In the cylindrical filter 70, a first end surface 71 abuts against the top plate 12, a second end surface 72 abuts against the flat surface 52, and a lower part (on the side of the bottom plate 22) of an outer circumferential surface 73 abuts against the outer annular wall 53. A cylindrical gap is formed between the cylindrical filter 70 and the upper circumferential wall 13 provided with the gas discharge ports 14.

The cylindrical guide member 60 is disposed between the first igniter 32 and the first communication hole 51 of the partition wall 50 so as to enclose the first igniter 32. In the cylindrical guide member 60, a first end opening 61 abuts against the bottom plate 22, and a second end opening 62 is disposed so as to be connected to the first communication hole 51 of the partition wall 50 and faces the first combustion chamber. The annular surface 63 which protrudes radially inward is formed at the second end opening 62. The annular surface 63 abuts against an undersurface (a surface on the side of the bottom plate 22) of the inner annular surface 56 of the partition wall 50. The second end opening 62 (an opening of the annular surface 63) has a size that is equal to or larger than that of the first communication hole 51 (an opening of the inner annular surface 56). In the cylindrical guide member 60, a plurality of second communication holes 65 are formed in a cylindrical wall 64 facing the second combustion chamber 40. Although the plurality of the second communication holes 65 may be circumferentially formed at regular intervals in the cylindrical wall 64, as shown in FIGS. 1 and 3, the plurality of second communication holes 65 are preferably formed only on a surface which is radially opposite to a surface facing the second igniter 42 of the cylindrical wall 64. An interior of the cylindrical guide member 60 is an accommodating space for the first igniter 32 and, when a transfer charge is accommodated in the cylindrical guide member 60, a remaining space excluding the first igniter 32 is a transfer charge chamber 66.

A first closing member 57, which is formed of a metallic adhesive tape and applied from inside to the annular surface 63 of the cylindrical guide member 60, closes the second end opening 62, thereby closing the first communication hole 51 between the interior of the cylindrical guide portion 60 and the first combustion chamber before actuation. The first closing member 57 can be applied to the inner annular surface 56 of the first communication hole 51 from inside. However, it is preferable to apply the first closing member 57 to the annular surface 63 of the cylindrical guide member 60 since a distance to the first igniter 32 is reduced and the first closing member 57 is more easily ruptured. A diameter of the second end opening 62 is larger than an opening diameter of each one of the second communication hole 65. The plurality of second communication holes 65 are closed from the inside of the cylindrical wall 64 by a second closing member 67 formed of a metallic adhesive tape.

The same metallic adhesive tape with a same thickness is used for the first closing member 57 and the second closing member 67. A hole diameter (approximately 1 to 2 mm) of each one of the plurality of second communication holes 65 is sufficiently smaller than a hole diameter (approximately 5 to 10 mm) of the first communication hole 51. Therefore, a rupturing pressure of the first closing member 57 is lower than a rupturing pressure of the second closing member 67 and, when the rupturing pressure of the second closing member 67 at the time of actuation of the first igniter 32 is 1, the rupturing pressure of the first closing member 57 ranges from 0.1 to 0.4.

FIG. 4 shows another embodiment of the second closing member 67.

In the second closing member 67, an inverted U-shaped incision (or a slit) 68 is formed in a region which includes therein the plurality of second communication holes 65 (a region 67a). However, even though the incision (or the slit)

68 is formed, the relation represented as "rupturing pressure of first closing member 57<rupturing pressure of second closing member 67" is satisfied. Further, since the second closing member 67 is applied to the cylindrical wall 64 from the inside, even when pressure is applied from the inside at the time of actuation of the first igniter 32, the incision 68 is not ruptured.

Next, an embodiment of a method for assembling the gas generator 1 will be described.

The first igniter 32 and the second igniter 42 are mounted to the two holes of the bottom plate 22 of the closure shell 21 respectively. Next, the cylindrical guide member 60 is fixed to the first igniter 32. The second gas generating agent 41 is accommodated in the second combustion chamber 40. The partition wall 50 is then disposed such that the outer annular surface 54 abuts against the annular stepped surface 24, the outer annular wall 53 abuts against the lower circumferential wall 23, the inner annular surface 56 abuts against the annular surface 63, and the inner annular wall 55 abuts against the cylindrical wall 64. At this point, since respective central axes of the first communication hole 51 and the second end opening 62 coincide with each other and the size of the second end opening 62 is larger than the size of the first communication hole 51 (size of the first communication hole 51<size of the second end opening 62), the entire first communication hole 51 is opened when the first closing member 57 is ruptured. Next, after disposing the cylindrical filter 70, the first gas generating agent 31 is accommodated. Subsequently, the closure shell 21 is covered by the diffuser shell 11 and the contact portion thereof is welded.

An operation of the gas generator 1 shown in FIG. 1, when mounted to an airbag apparatus will be described below. The gas generator 1 in accordance with the present invention exhibits an advantageous effect in the case where the first igniter 32 activates first and the second igniter 42 activates with a delay, or in the case where only the first igniter 32 activates. In the following example, the case where the first igniter 32 activates first and the second igniter 42 activates with a delay will be described.

When the first igniter 32 actuates first, by flames and the like generated from the first igniter 32, the transfer charge inside the transfer charge chamber 66 is ignited and burned to generate combustion products. The combustion products generated inside the transfer charge chamber 66 ruptures the first closing member 57 to open the first communication hole 51, and the combustion products enter the first combustion chamber 30 to igniter and burn the first gas generating agent. At this point, the first closing member 57 is always ruptured and opened first since the second closing member 67 is attached from the inside of the cylindrical wall 64 and the relation represented as "rupturing pressure of first closing member 57<rupturing pressure of second closing member 67" is satisfied. The second closing member 67 is not opened since the combustion products thereafter flow out into the first combustion chamber 30 and pressure inside the transfer charge chamber 66 drops.

The combustion gas generated by the combustion of the first gas generating agent 31 passes through the cylindrical filter 70, ruptures the seal tape, and is discharged through the gas discharge ports 14 to inflate an airbag.

When the second igniter 42 actuates, the second gas generating agent 41 is ignited and burned to generate a combustion gas. Ignition ability of the second gas generating agent 41 is preferably improved because the second igniter 42 is disposed to oppose the partition wall 50 and flames and the like generated at the time of the actuation are more likely to collide with the partition wall 50 and be diffused. The second gas generating agent 41 is ignited and burned successively from the proximity to the second igniter 42, and since the second communication holes 65 of the cylindrical guide member 60 are formed on the surface opposite to a surface facing the second igniter 42, an unburned portion of the second gas generating agent 41 is ignited and burned during the process of the combustion gas from the second gas generating agent 41 flowing toward the second communication holes 65. Thereby, combustion ability of the entire second gas generating agent 41 inside the second combustion chamber 40 is improved.

When the second communication holes 65 are opened by rupture of the second closing member 67, the combustion gas inside the second combustion chamber 40 enters the transfer charge chamber 66, passes through the first communication hole 51 and flows into the first combustion chamber 30, passes through the cylindrical filter 70, and is discharged through the gas discharge ports 14 to further inflate the airbag.

In the gas generator in accordance with the present invention, no means is provided in the partition wall 50 to allow a direct communication between the first combustion chamber 30 and the second combustion chamber 40. Therefore, the combustion gas from the second gas generating agent 41 always passes through the second communication holes 65. Accordingly, since a pressure of the second combustion chamber 40 always rises at the time of the actuation, the second closing member 67 is ruptured with good reproducibility.

In particular, with the structure in which the combustion gas from the second gas generating agent 41 always passes through the second communication holes 65, when the first igniter 32 and the second igniter 42 are actuated at the same time, even if a failure occurs in the first igniter 32, at least the second igniter 42 actuates, and it is possible to obtain approximately the same output as when the two igniters 32 and 42 are simultaneously actuated. This is because, specifically, the combustion gas from the second gas generating agent 41 ignites the transfer charge in the transfer charge chamber 66 and the first gas generating agent 31 in the first combustion chamber 30, and thereby, a combustion state similar to the case where the two igniters 32 and 42 are simultaneously actuated is realized.

When the second closing member 67 is formed as shown in (a) in FIG. 4, upon the combustion of the second gas generating agent, the second closing member 67 is ruptured at the incision 68 as shown in (b) in FIG. 4, and the region 67a bends inward to open the second communication holes 65.

In this manner, a difference in rupturing pressure between the first closing member 57 and the second closing member 67 reliably prevents a malfunction occurred by the combustion products, such as combustion gas, of the first gas generating agent 31 flowing into the second combustion chamber 40.

A gas generator in accordance with another embodiment of the present invention will be described with reference to FIG. 5.

A gas generator 1A shown in FIG. 5 is the same as the gas generator 1 shown in FIG. 1 except that a positional relation between a first communication hole 151 of a partition wall 150 and the second end opening 162 side of a cylindrical guide member 160 is different. The same numerals as those in FIG. 1 represent the same parts as those in FIG. 1.

An interior of the housing 10 is partitioned by the radially disposed partition wall 150 into the first combustion chamber 30 on the side of the top plate 12 and the second combustion chamber 40 on the side of the bottom plate 22. A first gas generating agent 31 is accommodated in the first combustion chamber 30 and a second gas generating agent 41 is accommodated in the second combustion chamber 40.

The partition wall 150 has a first communication hole 151 located eccentrically to the central axis X of the housing 10 toward the circumferential wall (the upper circumferential wall 13 and the lower circumferential wall 23), and the first communication hole is a single through hole. The partition wall 150 has a flat surface 152, an outer annular wall 153 extended toward the top plate 12 from an outer circumferential edge portion of the flat surface 152, and an outer annular surface 154 protruding radially outward from the outer annular wall 153. Further, the partition wall 150 has, along the cylindrical guide member 160 disposed in the second combustion chamber 40, an inner annular wall 155 extended toward the top plate 12 from the flat surface 152. In the partition wall 150, the outer annular surface 154 abuts against the annular stepped surface 24 (see FIG. 2) and the inner annular wall 155 abuts against a cylindrical wall 164 of the cylindrical guide member 160 on the side of the second end opening 162.

The cylindrical guide member 160 is disposed between the first igniter 32 and the first communication hole 151 of the partition wall 150 so as to enclose the first igniter 32. A first end opening 161 of the cylindrical guide member 160 abuts against the bottom plate 22, and the second end opening 162 side passes through the first communication hole 151 of the partition wall 150 and is disposed such that the second end opening 162 is located inside the first combustion chamber 30. An annular surface 163 which protrudes radially inward is formed at the second end opening 162. In the cylindrical guide member 160, a plurality of second communication holes 165 are formed in the cylindrical wall 164 facing the second combustion chamber 40. The plurality of the second communication holes 165 may be formed at regular intervals circumferentially in the cylindrical wall 164, but, as shown in FIG. 5 (and also see FIG. 3), the plurality of second communication holes 65 are preferably formed only on a surface radially opposite to a surface facing the second igniter 42 of the cylindrical wall 164. An interior of the cylindrical guide member 160 is an accommodating space for the first igniter 32 and, when a transfer charge is accommodated therein, a remaining space excluding the first igniter 32 is a transfer charge chamber 166.

In the embodiment shown in FIG. 5, the second end opening 162 is closed by a first closing member 157 formed of a metallic adhesive tape applied to the annular surface 163 of the cylindrical guide member 160 from inside, and the interior of the cylindrical guide member 160 is closed off from the first combustion chamber 30 before actuation. A diameter of the second end opening 162 is larger than an opening diameter of each one of the second communication hole 165. The plurality of second communication holes 165 are closed from the inside of the cylindrical wall 164 by a second closing member 167 formed of a metallic adhesive tape.

The gas generator 1A shown in FIG. 5 operates in a similar manner to the gas generator 1 shown in FIG. 1. Dispositions of the cylindrical guide members, the second end openings and the second communication holes in the embodiments shown in FIGS. 1 to 5 are not limited to those in the above Embodiments as long as an inflow of the combustion gas from the first combustion chamber to the second combustion chamber is prevented by utilizing a difference in rupturing pressure between the closing members.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a top plate, a bottom plate located axially opposite to the top plate, and a circumferential wall located between the top plate and the bottom plate and provided with a gas discharge port;
a partition wall provided with a first communication hole including a single through hole, the partition wall being radially disposed in the housing to partition an interior of the housing into a first combustion chamber on a side of the top plate, which accommodates a first gas generating agent, and a second combustion chamber on a side of the bottom plate, which accommodates a second gas generating agent;
a first igniter for burning the first gas generating agent and a second igniter for burning the second gas generating agent, the first and second igniters being attached to the bottom plate;
a cylindrical guide member being disposed between the first igniter and the first communication hole of the partition wall and provided with a second communication hole in a cylindrical wall thereof,
the cylindrical guide member being disposed so as to enclose the first igniter, such that a first end opening thereof is located on the side of the bottom plate and a second end opening thereof is connected to the first communication hole of the partition wall,
the second end opening or the first communication hole being closed by a first closing member in a state where the second end opening or the first communication hole faces the first combustion chamber, the second communication hole being closed by a second closing member in a state where the second communication hole faces the second combustion chamber, and a rupturing pressure of the first closing member being set lower than a rupturing pressure of the second closing member.

2. The gas generator according to claim 1, wherein the second communication hole of the cylindrical guide member is formed only on a surface of the cylindrical wall, opposite to a surface facing the second igniter.

3. The gas generator according to claim 1, wherein the first closing member and the second closing member are made of a same material and have a same thickness, and
the second communication hole is formed in plurality and a hole diameter of each one of the second communication holes is smaller than a hole diameter of the second end opening.

4. The gas generator according to claim 1, wherein, when the rupturing pressure of the second closing member is 1, the rupturing pressure of the first closing member is not more than 0.90.

5. The gas generator according to claim 1, wherein the second end opening of the cylindrical guide member has an annular surface protruding inward, the first closing member is disposed from inside onto the annular surface and closes the second end opening, and the second closing member is disposed from inside onto the cylindrical wall of the cylindrical guide member and closes the second communication hole.

6. A gas generator, comprising:
a housing having a top plate, a bottom plate located axially opposite to the top plate, and a circumferential wall located between the top plate and the bottom plate and provided with a gas discharge port;
a partition wall provided with a first communication hole including a single through hole, the partition wall being radially disposed in the housing to partition an interior of the housing into a first combustion chamber on a side of the top plate, which accommodates a first gas generating agent, and a second combustion chamber on a side of the bottom plate, which accommodates a second gas generating agent;
a first igniter for burning the first gas generating agent and a second igniter for burning the second gas generating agent, the first and second igniters being attached to the bottom plate;
a cylindrical guide member being disposed between the first igniter and the first communication hole of the partition wall and provided with a second communication hole in a cylindrical wall thereof,
the cylindrical guide member being disposed so as to enclose the first igniter, such that a first end opening thereof is located on the side of the bottom plate and a second end opening thereof enters into the first communication hole and faces an interior of the first combustion chamber,
the second end opening being closed by a first closing member in a state where the second end opening faces the first combustion chamber, the second communication hole being closed by a second closing member in a state where the second communication hole faces the second combustion chamber, and a rupturing pressure of the first closing member being set lower than a rupturing pressure of the second closing member.

7. The gas generator according to claim 6, wherein the second communication hole of the cylindrical guide member is formed only on a surface of the cylindrical wall, opposite to a surface facing the second igniter.

8. The gas generator according to claim 6, wherein the first closing member and the second closing member are made of a same material and have a same thickness, and
the second communication hole is formed in plurality and a hole diameter of each one of the second communication holes is smaller than a hole diameter of the second end opening.

9. The gas generator according to claim 6, wherein, when the rupturing pressure of the second closing member is 1, the rupturing pressure of the first closing member is not more than 0.90.

10. The gas generator according to claim 6, wherein the second end opening of the cylindrical guide member has an annular surface protruding inward, the first closing member is disposed from inside onto the annular surface and closes the second end opening, and
the second closing member is disposed from inside onto the cylindrical wall of the cylindrical guide member and closes the second communication hole.

* * * * *